United States Patent [19]

Eck

[11] Patent Number: 5,095,707

[45] Date of Patent: Mar. 17, 1992

[54] EXTRATERRESTRIAL PLANETARY POWER SUPPLY AND METHOD

[75] Inventor: Marshall B. Eck, Timonium, Md.

[73] Assignee: Fairchild Space and Defense Corporation, Germantown, Md.

[21] Appl. No.: 478,539

[22] Filed: Feb. 12, 1990

[51] Int. Cl.⁵ .................................................. F02G 1/02
[52] U.S. Cl. ........................................ 60/650; 60/682; 60/698; 60/721; 165/903
[58] Field of Search .............. 60/650, 682, 698, 721, 60/641.8, 648.15, 668, 669; 165/903

[56] References Cited

U.S. PATENT DOCUMENTS

| | | | |
|---|---|---|---|
| 4,002,031 | 1/1977 | Bell | 60/641.15 |
| 4,644,751 | 2/1987 | Hsu | 60/721 X |
| 4,761,957 | 8/1988 | Eberhardt et al. | 60/682 X |
| 4,785,634 | 11/1988 | Alderson et al. | 60/682 |

*Primary Examiner*—Allen M. Ostrager
*Attorney, Agent, or Firm*—Michael W. York

[57] ABSTRACT

A method for generating power and a power supply for use in the atmosphere on Mars that use the Martian atmosphere as a working fluid. The power supply has an open Brayton cycle combined turbocompressor and turbogenerator that use the Martian atmosphere for their operation. The Martian atmosphere working fluid picks up heat derived from a nuclear heat source that transfers the heat to the working fluid by laminar flow heat exchange. The combined turbocompressor and turbogenerator have provisions for separating dust from the dust laden Martian atmosphere and for operating with any residual Martian atmospheric dust that is ingested into the combined turbocompressor and turbogenerator. Reliability of operation is achieved by having two functionally separate power operating units that each have their own combined turbocompressor and turbogenerator and by only using one power unit at a time.

14 Claims, 2 Drawing Sheets

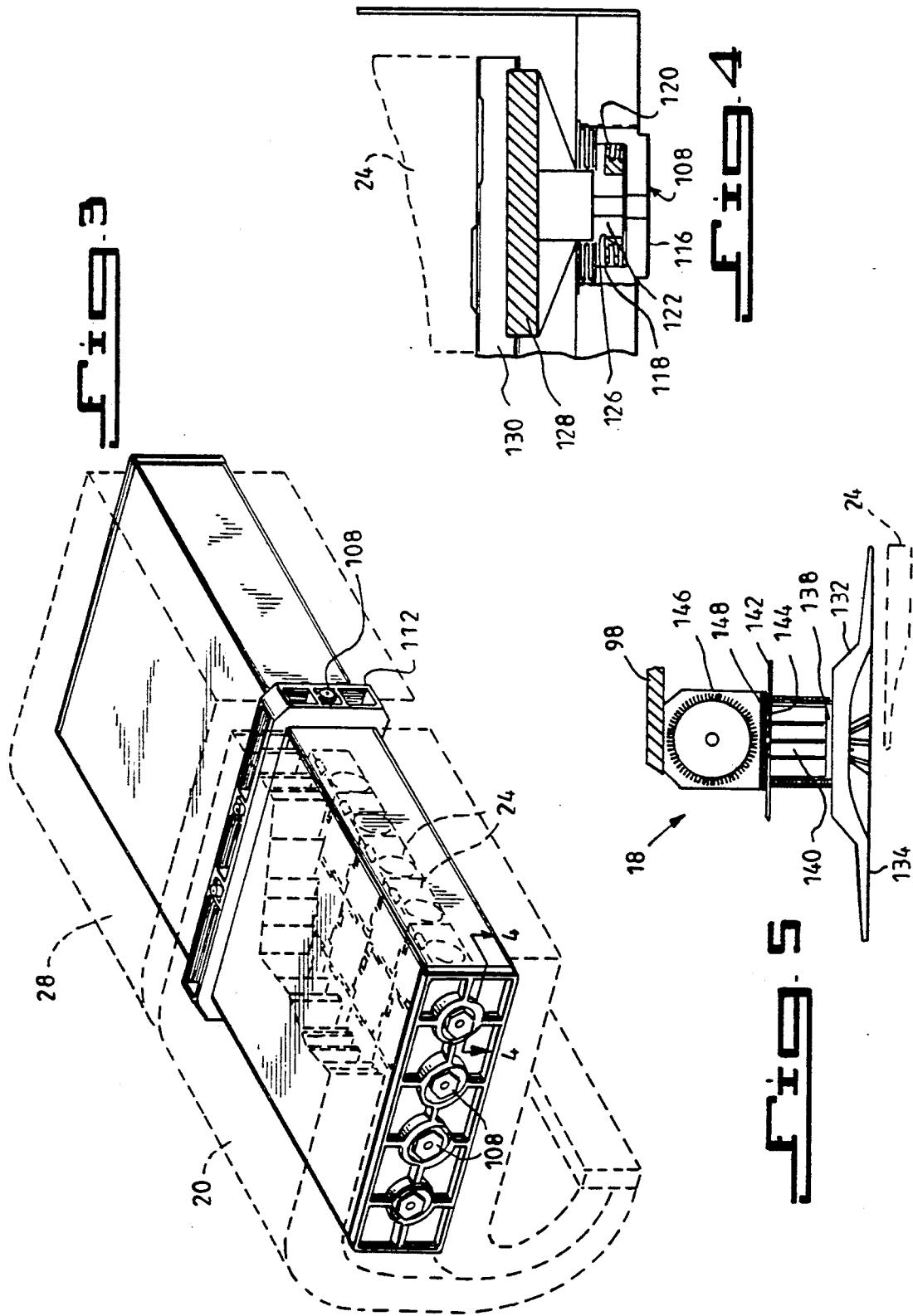

EXTRATERRESTRIAL PLANETARY POWER SUPPLY AND METHOD

BACKGROUND OF THE INVENTION

The extent of activities in the future on other planets such as Mars will be limited by the power that is available for such activities. Generally, the source of such power must come from Earth and be transported to its point of use on Mars or some other planet. Consequently, the size and weight of the potential power supply is limited due to the fact that it must be transported through space in a space vehicle which uses power in transit and is of necessity of limited size in view of the limits on the rocket motors necessary to place it in space.

Solar arrays have been used as a source of electrical energy in the past. However, such arrays are limited to situations where there is a dust free environment and where sunlight is readily available and there is also a problem with size since generally a large surface area is necessary in order to provide meaningful power. Also, solar arrays must be oriented properly to provide power and a storage mechanism must be provided for periods when there is no sunlight. Nuclear power sources that provide heat as a byproduct of nuclear radioactive energy are a potentially attractive source of power since these heat sources are very compact in relation to the potential available heat energy. However, there is a problem with such nuclear energy sources and that is the problem of converting the heat energy into a usable form of energy such as electrical energy.

It would be desirable that a power supply for use on a planet such as Mars use something that was available locally on the planet as a portion of the power supply system. In such a power supply system it would be expected that there would be a weight saving over a power supply system in which everything is brought in from outside the planet. Unfortunately, most planets are comparatively barren and would appear to contain little that could be used without expensive processing in conjunction with a power system. In the case of Mars, the surface is barren and the surface atmosphere is of low pressure and full of dust. This would appear to make the atmosphere unusable for anything connected with a power supply for use on a planet located in outerspace.

This invention avoids the problems associated with putting an effective power supply on other planets such as the difficulty of placing the power supply on the desired planet. This invention provides a compact effective power supply that is effective in a comparatively unhospitable environment such as on Mars. Moreover, this power supply makes use of the dust laden atmosphere of the planet Mars by having provisions for avoiding damage to the power supply caused by the dust in the atmosphere on the surface of Mars.

SUMMARY OF THE INVENTION

This invention relates to power supplies and methods related thereto and more particularly to power supplies and methods for use outside the planet Earth.

Accordingly, it is an object of the invention to provide a power supply that is adapted to be transported in space.

It is an object of the invention to provide a power supply that is adapted to operate on a planet other than earth.

It is an object of the invention to provide a power supply that uses the atmosphere on a planet other than earth for its operation.

It is an object of the invention to provide a power supply that is usable in a hostile environment.

It is an object of the invention to provide a power supply that is usable in an abrasive atmosphere.

It is an object of the invention to provide a power supply that is usable in a dust laden atmosphere.

It is also an object of the invention to provide a power supply that uses a dust laden atmosphere in its operation.

It is also an object of the invention to provide a power supply that uses the dust laden atmosphere of Mars as a heat transfer fluid.

It is also an object of the invention to provide a power supply that uses the dust laden atmosphere of Mars but separates at least a portion of the dust from the Martian atmosphere prior to using the atmosphere as a working fluid.

It is an object of the invention to provide a power supply that utilizes a low pressure drop yet efficient heat transfer system.

It is an object of the invention to provide a power supply which furnishes partial power during transit from earth to the destination planet when the destination planet atmosphere is not present.

It is an object of the invention to provide a power supply having a thermoelectric power conversion device and a variable conductance heat pipe thermal flux transformer.

It is an object of the invention to provide a power supply that has two modes of heat rejection.

It is an object of the invention to provide a power supply with an efficient heat transfer system that uses laminar flow of the heat transfer fluid.

It is an object of the invention to provide a power supply that uses a reliable heat source.

It is an object of the invention to provide a power supply that uses a heat source with a very long life.

It is also an object of the invention to provide a power supply with a heat source that furnishes a continuous uninterrupted source of heat.

It is also an object of the invention to provide a power supply which is highly reliable.

It is also an object of the invention to provide a power supply in which the critical components are duplicated in a backup or reserve power supply.

It is a further object of the invention to provide a method for providing power that uses an extraterrestrial atmosphere.

These and other objects of the invention are obtained from the extraterrestrial planetary power supply invention that includes a heat source, an open Brayton cycle combined turbocompressor and turbogenerator adapted to be driven by the Martian atmosphere and fluid heat transfer means comprising a portion of the Martian atmosphere for use by the combined turbocompressor and turbogenerator as its working fluid and for receiving heat from the heat source. The power supply also includes a thermoelectric power source that provides a continuous but reduced source of electric power. The invention includes a method that uses an extraterrestrial atmosphere.

BRIEF DESCRIPTION OF THE DRAWINGS

The invention will be hereinafter described in considerable detail with reference to the appended drawings in which:

FIG. 3 is an enlarged perspective view of a portion of the structure set forth in FIG. 1 with certain portions thereof broken away for clarity;

FIG. 4 is a sectional view of a portion of the structure illustrated in FIG. 3 taken in the direction 4—4 thereof; and FIG. 5 is an enlarged view of a portion of the structure illustrated in FIG. 2 taken within the circle 5 thereof

DETAILED DESCRIPTION OF THE PREFERRED EMBODIMENT

Figure 2:
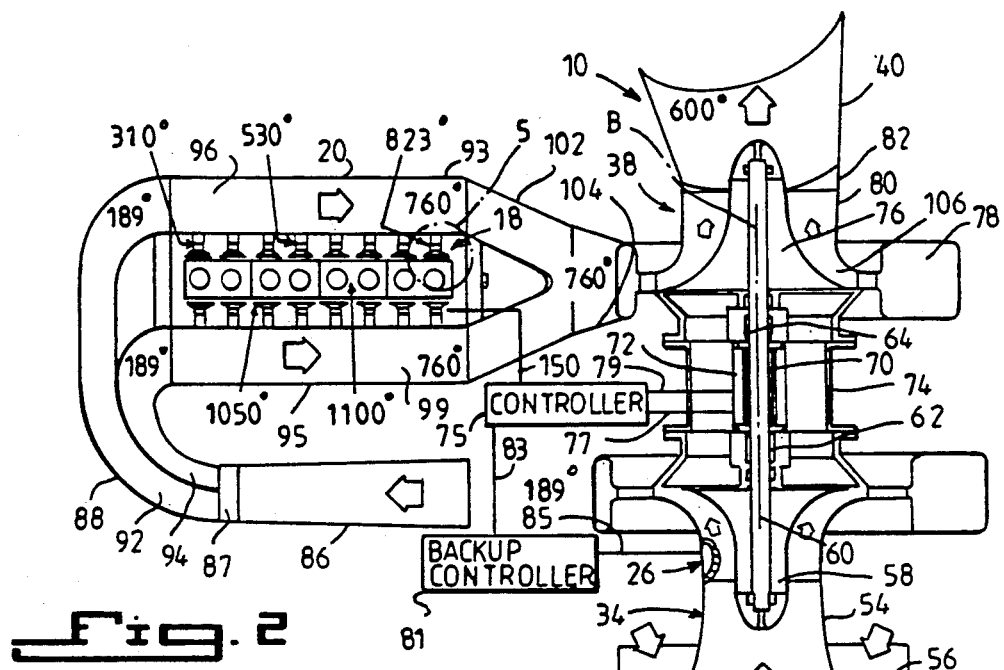
FIG. 2 is a cross sectional view taken substantially on the line 2—2 of FIG. 1 showing the interior workings of the extraterrestrial planetary power supply and heat exchange fluid flow path and temperature distribution.
Figure 1:
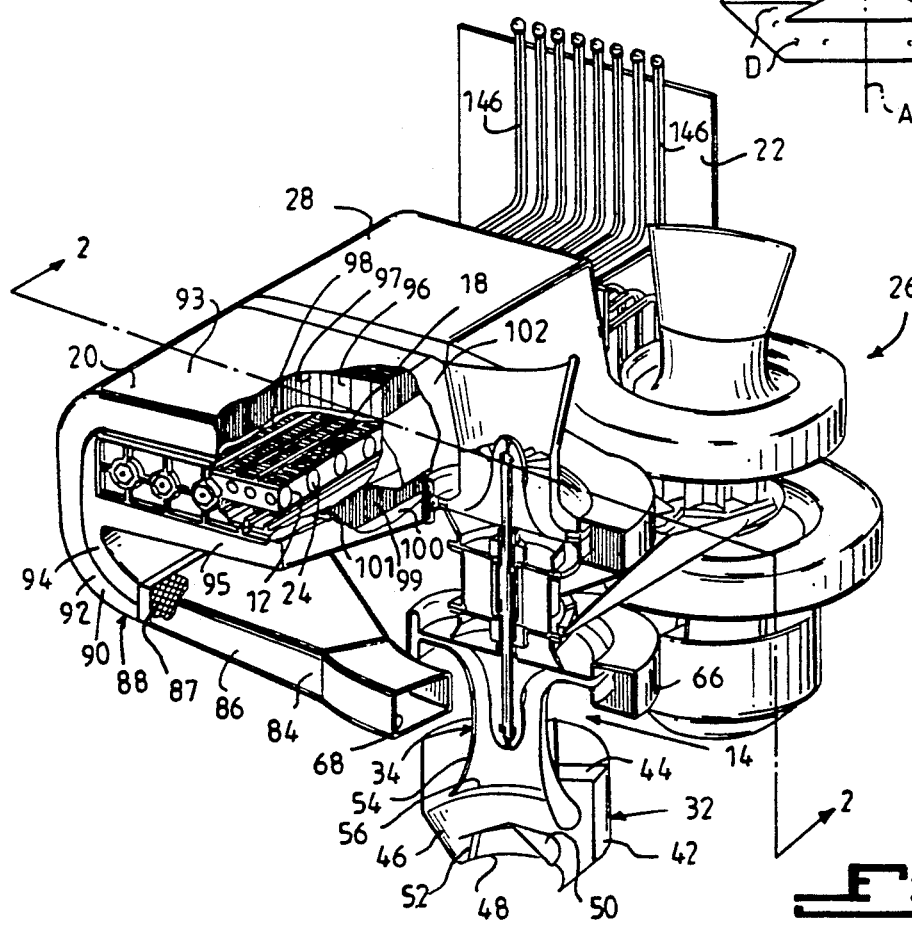
FIG. 1 is a perspective view of the extraterrestrial planetary power supply invention with portions broken away for the purpose of illustrating certain portions of the interior thereof.

The power supply invention is illustrated in FIGS. 1 and 2 and is designated generally by the number 10. The power supply 10 comprises five basic elements or structures that are a nuclear heat source 12, a combined turbocompressor and turbogenerator 14, a thermoelement and heat pipe assembly 18, a heat exchanger 20 and a waste heat radiator 22 for radiating heat. The nuclear heat source 12 comprises a planar array of forty general purpose heat source modules 24 that are known in the art and each comprise four iridium clad plutonia pellets that generate heat primarily by the alpha decay of Pu-238. Each module 24 generates some 250 watts of thermal power and the modules are similar to those used in the Galileo radioisotope heat source.

The power supply 10 also has several important standby or backup elements that include a standby combined turbocompressor and turbogenerator 26 and a standby heat exchanger 28 that are substantially similar to the previously described combined turbocompressor and turbogenerator 14 and associated heat exchanger 20. A portion of the heat source 12 is associated with the standby heat exchanger 28.

As illustrated in FIGS. 1 and 2, the combined turbocompressor and turbogenerator 14 comprises a dust separator 32 located at its lower end for separating dust and the like from the atmosphere that is drawn into the combined turbocompressor and turbogenerator, a compressor 34, an alternator 36, a turbine 38 and an outlet diffuser 40. The dust separator 32 is located just below the compressor 34 and comprises a hollow cylindrical member 42 whose central axis A generally coincides with the long central axis B of the combined turbocompressor and turbogenerator 14. This hollow cylindrical member 42 is held in place by thin support member 44 that connects the cylindrical member 42 to the lower end portion of the compressor 34. The lower portion 46 of the hollow cylindrical member 42 is tapered inward toward the central axis A and terminates at a generally circular shaped dust outlet opening 48. A cone shaped member 50 is located inside the lower tapered portion 46 above the opening 48 and is held in place by the support struts 52 that interconnect the lower tapered portion and the cone shaped member 50.

The compressor 34 has a hollow generally cylindrical inlet portion 54 that has a flared lower end portion 56 that is centrally located around the long axis B of the combined turbocompressor and turbogenerator 14 and extends into the upper interior portion of the dust separator 32. As indicated in FIG. 2 the atmosphere laden with dust D is drawn into the top opening of the dust separator 32 between the exterior of the compressor inlet portion 54 and the interior of the dust separator 32. The atmosphere must then make substantially a 180 degree turn so that it enters into the compressor inlet portion 54. This results in the separation of the dust D from the atmosphere due to inertia of the heavier dust particles D and also due to Martian gravity. The separated dust particles D pass between the exterior of the cone shaped member 50 and the interior of the tapered portion 46 and pass out of the opening 48. The cone shaped member 50 serves to prevent dust D from being pulled upward into the compressor inlet portion 54.

As illustrated in FIGS. 1 and 2, the compressor 34 includes a compressor wheel 58 that is rigidly connected to a combined compressor and generator shaft 60 that is rotary mounted on the central axis B of the combined turbocompressor and turbogenerator 26 on bearings 62 and 64. The compressor wheel 58 rotates and compresses the atmosphere within a compressor scroll 66 which causes the atmosphere within the scroll 66 to be compressed. The atmosphere that enters the compressor enters through the compressor inlet portion 54 and is compressed so that the atmosphere that exits the exit opening 68 of the compressor scroll 66 is compressed by 5 times so that the outlet pressure is five times the inlet pressure.

The alternator 36 is located immediately above the compressor 34 and it comprises an alternator rotor 70 rigidly connected to the rotatable shaft 60 and stator windings 72 secured in place around the rotatable alternator rotor 70. Cooling fins 74 are located at fixed intervals around the exterior of the stator windings 72 to cool the alternator 36. The start up and control of the operation of the alternator 36 is accomplished by a controller 75 that is electrically connected to the stator windings 72 via the leads 77 and 79. A backup controller 81 is connected to the controller 75 by the lead 83 and to the alternator (not shown) of the standby turbocompressor and turbogenerator 26 by the lead 85.

As illustrated in FIGS. 1 and 2, the turbine 38 is located immediately adjacent and above the alternator 36 and comprises a turbine wheel 76 rigidly fixed to the rotatable shaft 60 and a hollow turbine inlet scroll 78 that surrounds the turbine wheel 76. It should be noted that the turbine scroll 78 is configured so that the atmospheric pressure drops from the turbine scroll 78 inlet to its outlet so that the pressure at its outlet is only substantially 1/5 of its inlet pressure. As the turbine wheel 76 is turned it turns the shaft to which the wheel 76 is connected and this in turn turns the alternator rotor 70 which results in the alternator 36 generating electricity. The open outlet portion 80 of the turbine scroll 78 is connected to the lower open end portion 82 of the hollow outlet diffuser 40 through which the spent atmosphere is exhausted. It will, of course, be appreciated that all of the components of the combined turbocompressor and turbogenerator 14 are present in the backup or standby turbocompressor and turbogenerator 26.

As illustrated in FIGS. 1 and 2, the atmosphere that is compressed by the compressor 34 leaves the exit opening 68 of the compressor scroll 66 and enters the open inlet portion 84 of the hollow heat exchanger inlet duct 86 to a honeycomb flow straightener 87 that is located at the entrance to a hollow heat exchanger housing 88 to straighten the atmospheric flow and provide for laminar flow and hence better heat transfer in the heat exchanger 20 as a result of a higher heat transfer coefficient at a lower pressure drop. The hollow heat exchanger housing 88 that receives the atmosphere comprises a curved hollow inlet section 90 with two separate curved paths 92 and 94. These hollow curved path portions 92 and 94 lead to respective generally rectangular shaped hollow substantially identical heat exchange sections 93 and 95. The heat exchange section 93 has a series of vertically oriented heat exchange fins 96 that extend from the outer wall 97 of the section 93 to its inner wall 98 and the heat exchange section 95 has a series of substantially identical vertically oriented heat exchange fins 99 that also extend from the outer wall 100 of the heat exchange section 95 to its inner wall 101. In view of this arrangement heat passes from the heat exchange fins 96 and 99 to the adjacently located passing atmosphere. It will be noted that the thermoelectric and heat pipe assembly 18 that will be hereinafter described in detail is located between the inner walls 98 and 101 of the heat exchange sections 93 and 95 and the array of heat source modules 24 of the heat source 12.

As indicated in FIG. 2, the temperature of the atmosphere increases greatly as it passes past the heat exchanger fins 96 and 99 to the surrounding moving atmosphere results in very hot atmosphere leaving the heat exchanger housing sections 93 and 95 and entering the hollow generally funnel shaped inlet duct 102 of the turbine scroll 78 where the atmosphere enters the inlet aperture 104 of the scroll 78 and then expands and exerts a pushing force against the substantially identical turbine blades 106 of the turbine wheel 76. This expansion of the atmosphere and pushing against the turbine blades 106 moves inwardly and upwardly and then the atmosphere enters the hollow outlet diffuser at a substantially lower temperature than it entered the turbine scroll 78.

As best illustrated in FIG. 2, as the turbine wheel 76 and the connected shaft 60 is turned as a result of the action of the atmosphere pressing against the turbine blades 106, the alternator rotor 70 that is also rigidly attached to the shaft 60 is also turned and since this is located inside the stator windings 72 it results in the alternator 36 generating an electrical current. The same shaft 60 that is turning the alternator rotor 70 also turns the connected compressor wheel 58 which in turn causes the compressor 34 to operate in the previously described manner.

The details of the nuclear heat source 12 and the interior of the heat exchanger 20 are illustrated in FIGS. 3 and 4 where the array of heat source modules 24 are illustrated. Also, as illustrated, this array of heat source modules 24 is supported on its ends by a plurality of substantially identical support spring members 108 that are located on an end frame member 110. These support spring members 108 exert a spring force against the adjacent heat source module 24. A central support ring 112 is located around the center portion of the array of heat source modules 24. A plurality of support spring members 108 exert a spring force against the adjacent heat source modules 24 to support them and to accommodate differential expansion of the module 24 support structure.

The details of the support spring members 108 are illustrated in FIG. 4 where as illustrated, the support spring member 108 comprises an end support cap member 116 with a generally cylindrical interior aperture 118 that holds a belleville type spring 120 surrounding a generally cylindrical support member 122 that is also surrounded by a bellows 124. As illustrated, the cylindrical support member 122 has a step 126 that is contacted by the outer inner surface of the belleville spring 126 and hence the support member 122 is pushed outward away from the cap member 116 by the belleville spring 120. This support member 122 also contacts a block of pyrolytic graphite 128 that in turn contacts another graphite block 130 that in turn contacts the end of a heat module 24.

FIG. 5 illustrates in greater detail the thermoelectric and heat pipe assembly 18 portion of the structure illustrated in FIG. 2. The thermoelectric and heat pipe assembly 18 is located between the heat module 24 and the adjacent wall such as the wall 98 of the heat exchange section, such as the section 93 and comprises a graphite heat collector 132 with a generally rectangular shaped heat collector surface 134 that faces but is separated from the adjacent heat module 24. The opposite end portion 136 of the heat collector 132 is connected via a glass bond 138 to a multicouple 140 that uses heat differential to generate electric power in a manner known to those skilled in the art. The other side of the multicouple 140 is connected via a glass bond 144 to a tungsten interconnect 142 which is in turn connected to a heat pipe 146 by a compliant pad 148 known in the art and the other side of the heat pipe 146 is connected to the wall 98 of the heat exchange section 93. In view of this arrangement heat will continuously pass from the heat module 24 via the heat collector 132, through the multicouple 140 where electrical power is generated, to the heat pipe 146 where heat is transferred to the heat pipe working fluid. The multicouples 140 are electrically connected to the controller 75 as represented by the lead 150 in FIG. 2 to provide electrical power to the controller 75.

The power supply invention 10 is made and used in the following manner. In the preferred embodiment the compressor turbine wheel 58 is made in a conventional manner from titanium due to mass and erosion considerations. The turbine wheel 76 is made in a conventional manner from Inconel 792 and the associated surrounding turbine scroll 78 is made in a conventional manner from Inconel 617. The alternator 36 is a permanent magnet type that uses a Samarium-Cobalt magnet with an output of substantially 28 Volts Direct Current. The housing for the alternator 36 is made from Inconel as is the diffuser 40 and the exchanger housing 88. The separator 32 and the compressor scroll 66 are both made in a conventional manner from Inconel or titanium as are the other ducts. The heat exchanger fins 96 and 99 are made from copper and CuNi as is the radiator 22. The heat pipes 146 are made from Inconel and filled with a potassium working fluid. The multicouples 140 that are located between the heat pipes 146 and the heat modules 24 are conventional with GaP N-legs and standard P-legs and hence are not described in detail since they are known in the art. As previously indicated, the heat source modules 24 are known in the art. The power supply 10 is assembled using conventional techniques known in the art.

The power supply invention 10 is used in the following manner. While the power supply 10 is being transported to its destination in space, the combined turbocompressor and turbogenerator 14 or 26 will obviously not be working. However, the heat source modules 24 will still be generating heat and this heat will be transferred to the heat pipese 146 through the multicouples 140. The working fluid in the heat pipes 146 will then transfer the heat to the radiator 22 where the heat is radiated into space. The heat pipes 146 transfer heat from their warm areas to their colder areas and are very important to the power supply invention 10 since they allow the use of a higher temperature heat source than would be possible with just a combined turbocompressor and turbogenerator 14 because of structural limitations associated with the combined turbocompressor and turbogenerator 14. However, the combined turbocompressor and turbogenerator 14 also enhances the performance of the multicouples 140 and results in an increased electrical power output that is greater than when only the thermoelectric and heat pipe assemblies 18 are used. In this process the multicouples 140 generate electrical power that can be put to use.

When the power supply 10 is located on a suitable planet with an atmosphere, the combined turbocompressor and turbogenerator 14 is put into operation and its alternator 36 is put into use. The starting of the combined turbocompressor and turbogenerator 14 is accomplished through the controller 75 that directs electrical power via the leads 77 and 79 to the alternator 36 which causes "motoring" of the alternator 36 or causes it to act as a motor and hence drive the compressor 34. Once the alternator 36 reaches operating speed, the controller 75 electrically extracts power from the alternater 36. If the controller 75 senses a speed drop in the alternator 36, it causes the backup controller 81 FIG. 2 ) to take the place of the controller 75 and start the alternator (not shown) of the standby turbocompressor and turbogenerator 26. The multicouples 140 will, of course, continue to generate useable electrical power when the turbine 36 is in use.

If the combined turbocompressor and turbogenerator 14 should fail, then the backup combined turbocompressor and turbogenerator 26 and its associated back up heat exchanger 28 will be put into use. Not only does this backup system permit the continued production of electric power, but it also permits the periodic shut down of the combined turbocompressor and turbogenerator 14 or 26 for inspection, servicing and repair in the case of a manned mission. When the power supply 10 is to be moved from a suitable planet, the combined turbocompressor and turbogenerators 14 and 26 will be shut down and the radiator 22 and associated heat pipes 18 and multicoupler put into use when the power supply 10 has no access to a suitable planetary atmosphere.

The method of the invention is practiced in the following manner. The power supply 10 is transported to a suitable extraterrestrial location in space through the use of a suitable space vehicle (not shown) in a manner known to those skilled in the art. During the transportation of the power supply to its intended extraterrestrial location electrical power ca be derived from the power supply 10 through the thermoelectric and heat pipe assembly 18 and the associated radiator 22 by positioning the radiator 22 so that it can radiate heat to a suitable location such as into space. Then when the power supply 10 is located at its intended location in space where there is a suitable atmosphere such as on Mars, the combined turbocompressor and turbogenerator 14 is activated through the use of the controller 75. This results in the intake of the extraterrestrial atmosphere into the power supply 10 and the operation of the combined turbocompressor and turbogenerator 14 to generate additional electrical power in addition to that provided previously by the thermoelectric and heat pipe assembly 18.

It should be noted that when the power supply 10 is transported to a suitable extraterrestrial location in space and then placed in operation at such a location in the previously described manner, two complete combined turbocompressors and turbogenerators 14 and 26 are provided as part of the power supply 10. However, in the method of the invention only one combined turbocompressor and turbogenerator 14 or 26 is used at one time. However, if the one that is being used or is in operation should fail or be subject to possible failure, then the other combined turbocompressor and turbogenerator 14 or 26 is brought into operation to replace the unit that has failed or is subject to failure. With the method of the invention one combined turbocompressor and turbogenerator 14 or 26 can be shut down for maintenance and the other combined turbocompressor and turbogenerator put into operation in order to continue to maintain a substantially consistent electrical output from the power supply 10.

Although the invention has been described in considerable detail with reference to a certain preferred embodiments, it will be understood that variations and modifications may be made to the invention without departing from the spirit and scope of the invention as described in the appended claims.

What is claimed is:

1. An extraterrestrial power supply for use in a low pressure atmosphere outside the atmosphere of the earth comprising a combined turbocompressor and turbogenerator having means for receiving said atmosphere outside the atmosphere of the earth, a heat source, and heat transfer means operatively connected to said heat source and located in fluid communication with said combined turbocompressor and turbogenerator to contact said atmosphere outside the atmosphere of the earth for transferring heat from said heat source to said atmosphere outside the atmosphere of the earth to operate said combined turbocompressor and turbogenerator, said heat transfer means comprising a laminar flow heat exchanger.

2. The power supply of claim 1 wherein said laminar flow heat exchanger includes a flow straightener.

3. The power supply of claim 1 further comprising thermoelectric power means located between said heat source and said laminar flow heat exchanger for using heat to generate electric power.

4. The power supply of claim 3 wherein said thermoelectric power means comprises multicouples.

5. The power supply of claim 3 further comprising a plurality of heat pipes associated with said thermoelectric power means.

6. The power supply of claim 5 further comprising a waste heat radiator operatively connected to said heat pipes.

7. The power supply of claim 6 wherein the said means for receiving the atmosphere outside the atmosphere of the earth of said turbocompressor and turbogenerator comprises a dust separator for separating dust from the received atmosphere.

8. The power supply of claim 7 wherein said combined turbocompressor and turbogenerator includes an alternator and further comprising a controller operatively connected to said alternator to start up and control the operation of said alternator.

9. The power supply of claim 8 wherein said heat source comprises a nuclear heat source.

10. The power supply of claim 1 further comprising a standby combined turbocompressor and turbogenerator and an associated standby laminar heat exchanger.

11. A method for generating power at an extraterrestrial planetary location having a low pressure atmosphere comprising the steps of:
   a. providing a power supply with a heat source, a combined turbocompressor and turbogenerator and a laminar flow heat exchanger;
   b. transporting said power supply with a heat source, a combined turbocompressor and turbogenerator and a laminar flow heat exchanger to an extraterrestrial planetary location with a low pressure atmosphere; and
   c. using said power supply with the heat source, the combined turbocompressor and turbogenerator, the laminar flow heat exchanger and said low pressure atmosphere to generate power at said extraterrestrial planetary location.

12. The method for generating power of claim 11 wherein said step of transporting the power supply includes transporting thermoelectric power means for using heat to generate electric power and further comprising the step of using said thermoelectric power means to generate electric power as said power supply is being transported to an extraterrestrial planetary location with a low pressure atmosphere.

13. The method for generating power of claim 12 wherein said step of transporting a power supply also includes transporting a second standby combined turbocompressor and turbogenerator and an associated standby laminar flow heat exchanger to an extraterrestrial planetary location with a low pressure atmosphere.

14. The method for generating power of claim 13 further comprising the step of using said second standby combined turbocompressor and turbogenerator and associated standby laminar flow heat exchanger to generate power when the combined turbocompressor and turbogenerator and laminar flow heat exchanger which is generating power is subject to possible failure.

* * * * *